United States Patent [19]

Tangi et al.

[11] Patent Number: 5,648,882

[45] Date of Patent: Jul. 15, 1997

[54] FRONT STRUCTURE FOR MAGNETIC RECORDING SYSTEM

[75] Inventors: Yoshinori Tangi; Yoshihiro Okano; Tsuneo Uwabo, all of Tokyo, Japan

[73] Assignee: Mitsumi Electric Company, Ltd., Tokyo, Japan

[21] Appl. No.: 264,324

[22] Filed: Jun. 23, 1994

[30] Foreign Application Priority Data

| Jun. 30, 1993 | [JP] | Japan | 5-041369 |
| Jun. 30, 1993 | [JP] | Japan | 5-041370 |
| Jun. 30, 1993 | [JP] | Japan | 5-041371 |
| Jun. 30, 1993 | [JP] | Japan | 5-041372 |
| Jun. 30, 1993 | [JP] | Japan | 5-041373 |

[51] Int. Cl.$^6$ .................................................. G11B 33/02
[52] U.S. Cl. ........................................ 360/99.06; 369/77.2
[58] Field of Search .............................. 360/99.02, 99.06, 360/97.01; 369/77.1, 77.2

[56] References Cited

U.S. PATENT DOCUMENTS

| 4,785,365 | 11/1988 | Okita | 360/99.02 |
| 4,864,440 | 9/1989 | Satoh et al. | 360/99.02 |
| 4,878,138 | 10/1989 | Ando et al. | 360/99.02 |
| 5,060,101 | 10/1991 | Isomura | 360/99.06 |
| 5,179,484 | 1/1993 | Nakajima | 360/99.06 |
| 5,229,987 | 7/1993 | Aoki | 369/77.1 |

FOREIGN PATENT DOCUMENTS 6079557  5/1985  Japan .................. 360/99.02

*Primary Examiner*—Stuart S. Levy
*Assistant Examiner*—David D. Davis
*Attorney, Agent, or Firm*—Whitham, Curtis, Whitham & McGinn

[57] ABSTRACT

A front structure for a magnetic recording device includes a main chassis; a front frame secured to a front portion of a main chassis, the front frame being made of a resin and having a disk insertion opening; and a front door for closing for closing the disk insertion opening, the front door pivotally supported by the main chassis and positioned on a back side of the front frame.

13 Claims, 4 Drawing Sheets

FRONT STRUCTURE FOR MAGNETIC RECORDING SYSTEM

BACKGROUND OF THE INVENTION

1. Field of the Invention

The device relates to a magnetic recording system such as a floppy disk drive system, and more particularly, to a front structure for a downsized magnetic recording system.

2. Related Art

In general, the front of a conventional magnetic recording system using a cartridge type magnetic medium such as a floppy disk, e.g., the front of a 3.5" floppy disk drive system is designed as shown in FIGS. 5 and 6. A front frame C made of a resin and having a disk insertion opening B in a central portion thereof is secured to a front portion $a_1$ of a shallow U-shaped main chassis A. The front frame C is rigidly secured to the main chassis A by hooking clips $c_1$ molded integrally on both sides of the back of the front frame C to corresponding hooking holes $a_4$ arranged on both lateral walls $a_2$, $a_3$ of the main chassis A and fitting the front portion $a_1$ of the main chassis A into both lateral side portions $c_2$, $c_3$ and a lower side portion $c_4$ of the front frame C.

Shaft support portions $c_6$ into which pivot pins $d_1$ of a front door D can be press-fitted are molded integrally on both sides of the back of an upper side portion $c_5$ of the front frame C, the front door D serving to close the disk insertion opening B. Therefore, the front door D is held closed at all times by return springs E set on the shaft support portions $c_6$. A floppy disk X can be inserted into a disk holder F located in the depth of the disk insertion opening B by forcibly opening the front door D with the floppy disk X.

A light emitting diode (LED) G for indicating operating conditions of the drive system and an eject button H are arranged on the lower side portion $c_4$ of the front frame C. The eject button H passes through a button hole $c_6$ arranged on the lower side portion $c_4$.

There exists a persistent demand for downsizing the thus constructed 3.5" floppy disk drive system so that the drive system can be built in a portable word processor and a personal computer which are required to be smaller and lighter. What imposes a problem in downsizing the front of the drive system is the design of the horizontal dimension $W_1$, the vertical dimension $H_1$, and the depth $L_1$. To reduce the vertical dimension $H_1$ of the drive system out of these dimensions $W_1$, $H_1$, $L_1$, the following problems must be overcome.

That is, even if the horizontal dimension $W_1$ and the vertical dimension $H_1$ of the drive system are managed to be reduced for downsizing purposes, the sectional areas, i.e., the second moments of area of the upper side portion $c_5$, both lateral side portions $c_2$, $c_3$, and the lower side portion $c_4$ are also reduced, with a particular reduction in the mechanical strength of the upper side portion $c_5$. As a result, the problem of deformation or breakage of the upper side portion due to external force must be considered. In other words, since the lower side portion $c_4$ and both lateral side portions $c_2$, $c_3$ are secured to the highly rigid main chassis A while fitted into the front portion $a_1$ of the main chassis A, reduction in the thicknesses thereof is not considered a great problem. However, the horizontally thin and long upper side portion $c_5$ is secured to both lateral side portions $c_2$, $c_3$ only at both ends thereof, and this may impose a problem of deformation or shearing fracture thereof due to reduction in the second moment of area.

Further, the conventional front door D, whose vertical dimension $h_1$ is large compared with the size of the disk insertion opening B, requires an adequate opening stroke. Therefore, the opening stroke in the depth direction becomes an obstacle for reducing the depth $L_1$.

Still further, the button hole $c_6$ for allowing the eject button H to pass therethrough is formed on the lower side portion $c_4$ of the front frame C, which becomes an obstacle for reducing the vertical dimension $H_1$ of the front frame C. That is, while the button holes $c_6$ are formed on the upper side portion $c_5$ and the lower side portion $c_4$ of the front frame C, even if the thicknesses of these holes are reduced by managing to reduce the vertical dimensions of the upper side portion $c_5$ and the lower side portion $c_4$, the mechanical strength of the portions surrounding the button holes $c_6$ is reduced. As a result, the front frame C is subjected to cracks and deformation due to secular change.

In addition, the operation of assembling the front frame C and the eject button H is such that the eject button H is positioned in the rear of the front frame C and then the eject button H is inserted into the corresponding button hole $c_6$ by advancing the eject button H toward the front frame C. Such assembling operation complicates the process of assembling the drive system.

Still further, since the shaft support portions $c_6$ are molded integrally on the back of the front frame C in order to mount the front door D, it is difficult to shorten the depth $L_1$.

In addition, since the shaft support portions $c_6$ are molded integrally on both lateral side portions $c_2$, $c_3$ of the front frame C, the horizontal dimension $W_1$ of the drive system cannot be reduced by reducing the thicknesses of both lateral side portions $c_2$, $c_3$.

SUMMARY OF THE INVENTON

In view of the above problems associated with the downsizing of the conventional magnetic recording system, an object of the device is to provide a front structure in which the upper side portion of the front frame is not subjected to deformation or shearing fracture due to external force even if the vertical section of the upper side portion is reduced.

In view of the above problems associated with the downsizing of the conventional magnetic recording system, another object of the device is to provide a front structure in which the depth of the magnetic recording system can be reduced.

In view of the above problems associated with the downsizing of the conventional magnetic recording system, another object of the device is to provide a front structure in which the vertical dimension of the front frame can be reduced without causing cracks and deformation due to secular change and by which the assembling process can be simplified.

In view of the above problems associated with the downsizing of the conventional magnetic recording system, another object of the device is to provide a front structure with which the magnetic recording system can be downsized by reducing both depth and horizontal dimension thereof.

To achieve the above objects, the device is applied to a front structure for a magnetic recording system in which a lower side portion and both lateral side portions of a front frame are secured to a front portion of a main chassis, the front frame being made of a resin and having a disk insertion opening; and an upper portion of the main chassis is covered with a cam plate. In such front structure, a back projection projecting rearward is integrally molded at the center of the back of the upper side portion of the front frame, and a distal end of a front end extension of the cam plate is positioned immediately below the back projection, so that deformation of the upper side portion due to external force can be prevented.

To achieve the above objects, the device is applied to a front structure for a magnetic recording system in which a front frame being made of a resin and having a disk insertion opening is secured to a front portion of a main chassis; and a front door for closing the disk insertion opening is pivotally supported at an upper position on the back side of the front frame, the front door being openable. In such front structure, a vertical dimension of the front door is set to a value substantially equal to a dimension of the opening on the back side of the disk insertion opening; a stopper projection is integrally molded on a lower portion of the front door; and the stopper projection is abutted against any one of the back of the front frame, a disk holder, or a cam plate.

To achieve the above objects, the device is applied to a front structure for a magnetic recording system in which a front frame being made of a resin and having a disk insertion opening is secured to a front portion of a main chassis; and an eject button connected to an eject lever is projected frontward from the front frame. In such front structure, a recess is formed on an upper side portion or the lower side portion of the front frame, the recess having an opening toward an upper surface of the upper side portion or a lower surface of the lower side portion; and the eject button is set on the front frame from the upper surface side of the upper side portion or from the lower surface side of the lower side portion.

To achieve the above objects, the device is applied to a front structure for a magnetic recording system in which a front frame being made of a resin and having a disk insertion opening is secured to a front portion of a main chassis; and a front door for closing the disk insertion opening is pivotally supported at an upper position on the back side of the front frame, the front door being openable. In such front structure, a pair of small door attaching holes are arranged on upper front corners of both lateral walls of the main chassis; and the front door having integrally molded pivot pins corresponding to the door attaching holes is given flexibility, so that the corresponding pivot pins can be inserted into the door attaching holes by resiliently flexing the front door.

To achieve the above objects, the device is applied to a front structure for a magnetic recording system in which a lower side portion and both lateral side portions of a front frame are secured to a front portion of a main chassis, the front frame being made of a resin and having a disk insertion opening; and a front door for closing the disk insertion opening is arranged on the back side of the front frame. In such front structure, at least a single back projection projecting rearward is integrally molded on the back of the upper side portion of the front frame, and the back projection is positioned on an upper edge of the front door, so that deformation of the upper side portion due to external force can be prevented.

As is apparent from the foregoing, according to the device, the back projection integrally molded on the upper side portion of the front frame is received from below by the front end extension of the highly rigid cam plate. Therefore, even if the upper side portion of the front frame has a small sectional area, a structure that is free from deformation or shearing fracture of the upper side portion can be obtained.

As is apparent from the foregoing, according to the device, the back projections integrally molded on the upper side portion of the front frame are abutted against the front door whose second moment of area in the vertical direction is relatively large when the upper side portion is about to be deformed by an external force. Therefore, even if the upper side portion of the front frame has a small sectional area, a magnetic drive system of such a simple structure as not to allow the upper side portion to be subjected to deformation and shearing fracture by external force can be obtained.

As is apparent from the foregoing, according to the device, the closing and opening positions of the front door are provided by the main body and the stopper projection molded integrally on the lower portion of the main body, the main body being of a small dimension in the vertical direction which is substantially equal to the dimension of the opening on the back side of the disk insertion opening formed on the front frame. Therefore, the depth of a magnetic recording system can be reduced to allow the magnetic recording system to be downsized as a whole.

As is apparent from the foregoing, according to the device, a pair of small door attaching holes are formed on the upper front corners of both lateral walls of the main chassis, and the pivot pins molded integrally on the front door are inserted into the door attaching holes with the front door resiliently flexed. Therefore, a downsized magnetic recording system whose vertical and horizontal dimensions are reduced can be obtained.

As is apparent from the foregoing, according to the device, the recess is formed on the upper side portion or the lower side portion to locate the eject button on the recess. Therefore, even if the vertical dimension of the front frame is reduced, a structure that is free from cracks and deformation of the upper and lower side portions due to secular change can be obtained. In addition, according to the device, an assembling method involving the step of setting the eject button on the recess of the front frame either from above or from below can be adopted, which contributes to simplifying the assembling process.

DETAILED DESCRIPTION OF THE PREFERRED EMBODIMENTS

Embodiments of the device will be described in detail with reference to FIGS. 1 to 4.

Figure 1:
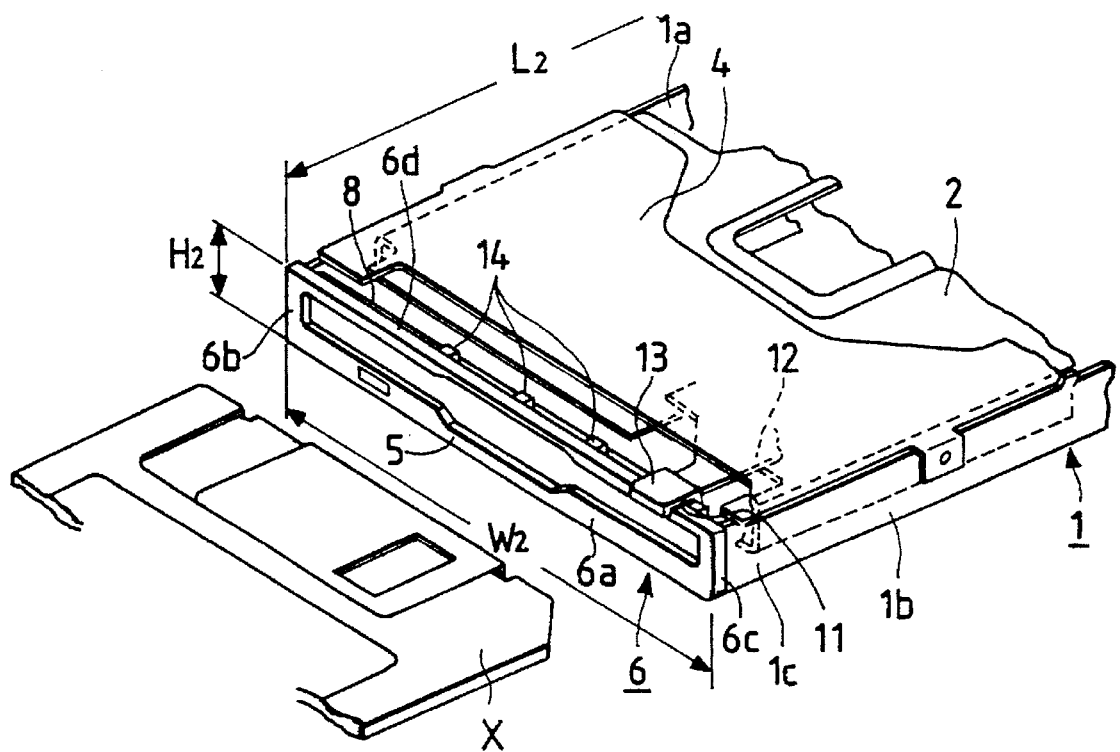
FIG. 1 is a perspective view of a 3.5" floppy disk drive system of the device.

FIG. 1 shows a 3.5" floppy disk drive system of the device, which is characterized in that the horizontal dimension $W_2$, the vertical dimension $H_2$, and the depth $L_2$ thereof are downsized compared with conventional magnetic recording systems.

Figure 2:
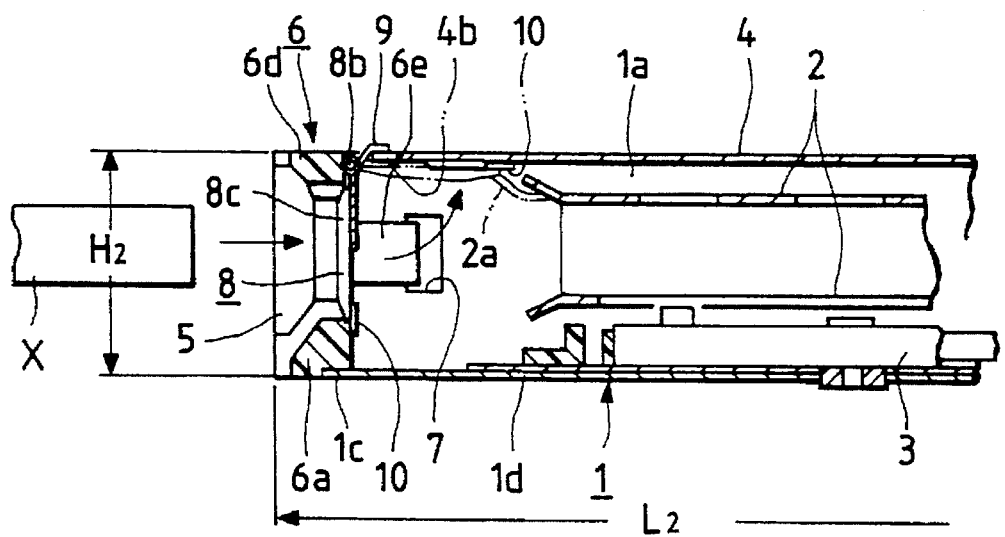
FIG. 2 is an enlarged sectional view showing a main portion of the 3.5" floppy disk drive system of FIG. 1.

In FIGS. 1 to 3, a disk holder 2 is contained in a shallow U-shaped main chassis 1 made of a metal plate by molding.

The disk holder 2 is caused to move vertically by a not shown vertically driving mechanism. A floppy disk X is rotated by a disk drive 3 when inserted into this disk holder 2.

In the drive system, which is the shown embodiment of the device, the upper portion of the disk holder 2 is covered with a cam plate 4 that is fixed by attaching screws 4a at front portions of both lateral walls 1a, 1b of the main chassis 1 as shown in FIG. 3.

A front frame 6 is fixed on front portions 1c of the main chassis 1. The front frame 6 is made of a resin by molding with a disk insertion opening 5 already formed in a central portion thereof. More specifically, a bottom wall 1d and the front portions 1c of both lateral walls 1a, 1b of the main chassis 1 are engaged with stepped portions that are formed on a lower side portion 6a and the rear portions of both lateral side portions 6b, 6c of the front frame 6. By hooking clips 6e molded integrally on the back of both lateral side portions 6b, 6c to hooking holes 7 arranged on both lateral walls 1a, 1b of the main chassis 1, the entire part of the front frame 6 is securely fixed on the main chassis 1.

Door attaching holes 1e, 1f are formed on upper front corners of both lateral walls 1a, 1b of the main chassis 1. As will be described later, left and right pivot pins 8a, 8b of a flexible front door 8 can be inserted into the door attaching holes 1e, 1f. These pivot pins 8a, 8b can be inserted into the door attaching holes 1e, 1f with a main body 8c of the front door 8 resiliently bent.

Figure 3A:
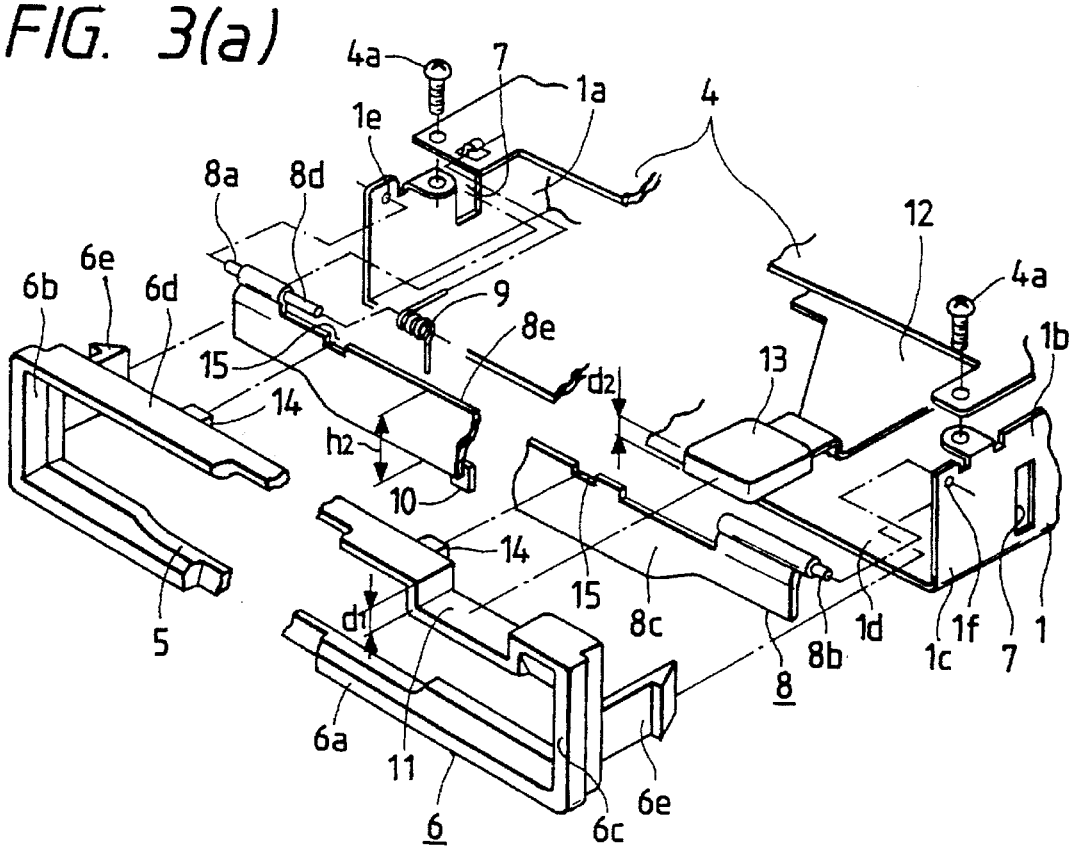
FIGS. 3 (a) and (b) are enlarged exploded perspective views showing the main portion of the 3.5" floppy disk drive system of FIG. 1.
Figure 3B:
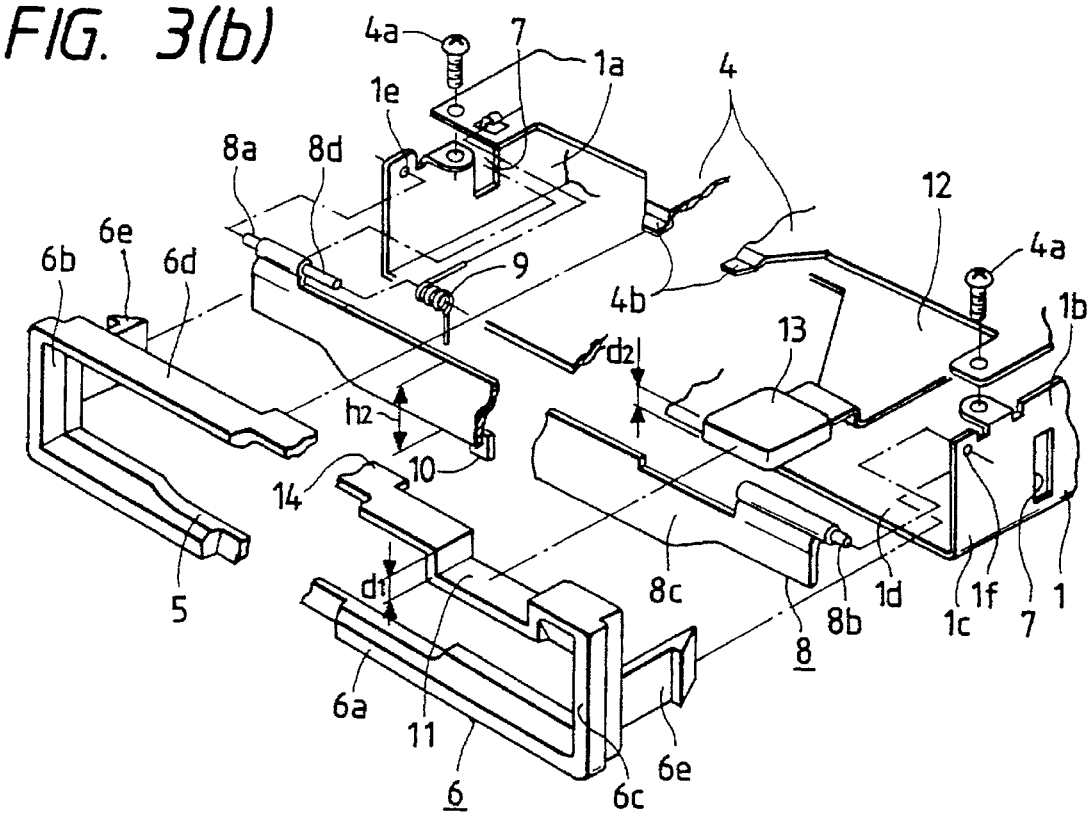

As is understood from FIGS. 3a and 3b, the front door 8 formed of a resin by molding in a manner similar to the front frame 6 is designed so that a vertical dimension $h_2$ of the main body 8c is substantially equal to the dimension of the opening on the back side of the disk insertion hole 5 of the main chassis 1 in order to minimize the opening stroke during opening and closing and reduce the weight. The pair of pivot pins 8a, 8b are molded integrally on both upper lateral edges of the main body 8c of the front door 8. An attaching pin 8d for allowing a return spring 9 to be fitted therein is integrally molded at a portion close to the left side pivot pin 8a. The return spring 9 is provided to urge the front door 8 so as to return in the closing direction.

As shown in FIG. 2, a stopper projection 10 is integrally molded at a lower central portion of the main body 8c of the front door 8. The stopper projection 10 can be abutted against the back of the lower side portion 6a of the front frame 6. Therefore, even if the vertical dimension $h_2$ of the main body 8c is set to a value substantially equal to the dimension of the disk insertion opening 5, the closing position of the front door 8 can be provided by the abutting of the stopper projection 10 against the lower side portion 6a of the front frame 6. The opening position of the front door 8 is, as understood from FIG. 2, determined by the abutting of the stopper projection 10 against the cam plate 4.

To reduce the vertical dimension $H_2$ of the front frame 6, a recess 11 having an opening facing upward is formed at a portion close to one end of the upper side portion 6d of the front frame 6. An eject button 13 fixed at a front end portion of an eject lever 12 is arranged on the recess 11 so as to be movable back and forth. More specifically, in the case of the shown embodiment, a vertical dimension (depth) $d_1$ of the recess 11 is set to a value substantially equal to a vertical dimension (thickness) $d_2$ of the eject button 13. Therefore, with the eject button 13 attached to the front frame 6, the upper surface of the eject button 13 is level with the upper surface of the upper side portion 6d of the front frame 6.

Figure 4A:
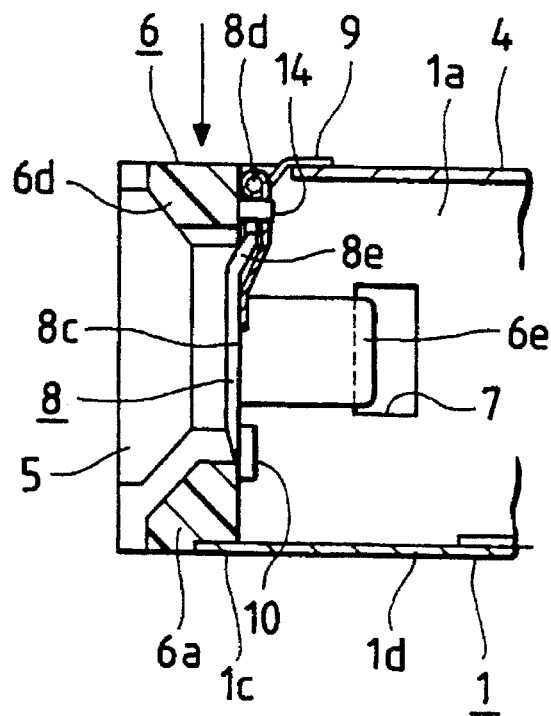
FIGS. 4 (a) and (b) are diagrams illustrative of how an external force is exerted upon the 3.5" floppy disk drive system of FIG. 1.
Figure 4B:
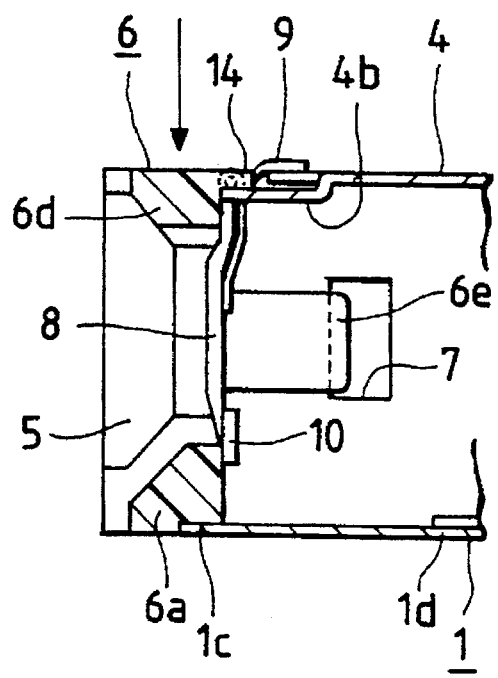
Figure 5:
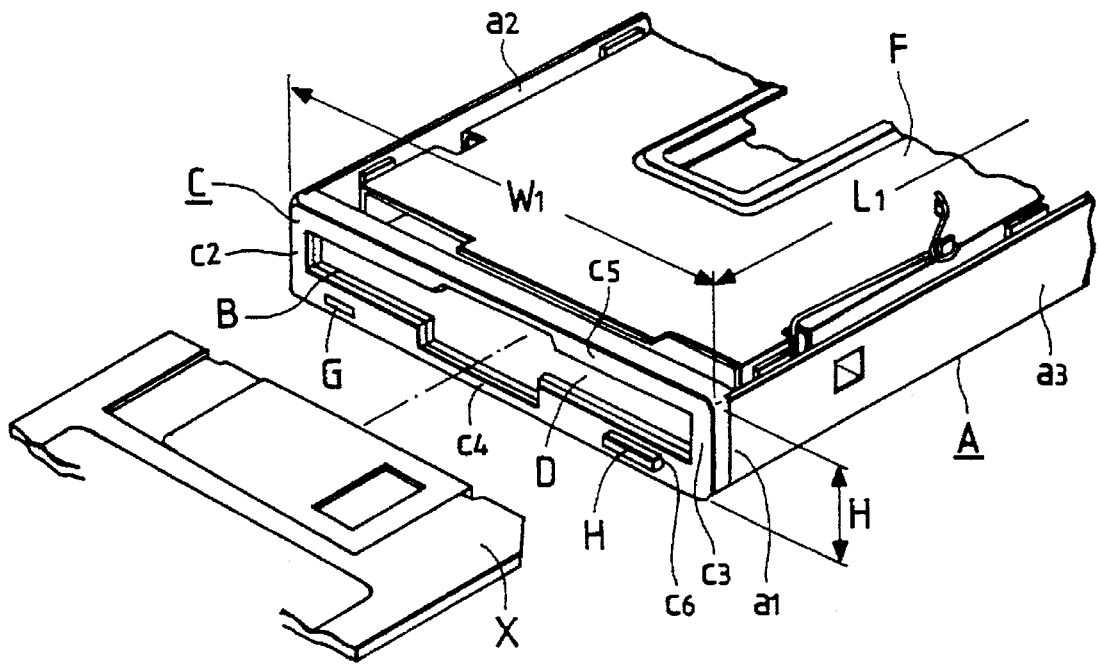
FIG. 5 is a perspective view of a conventional 3.5" floppy disk drive system.
Figure 6:
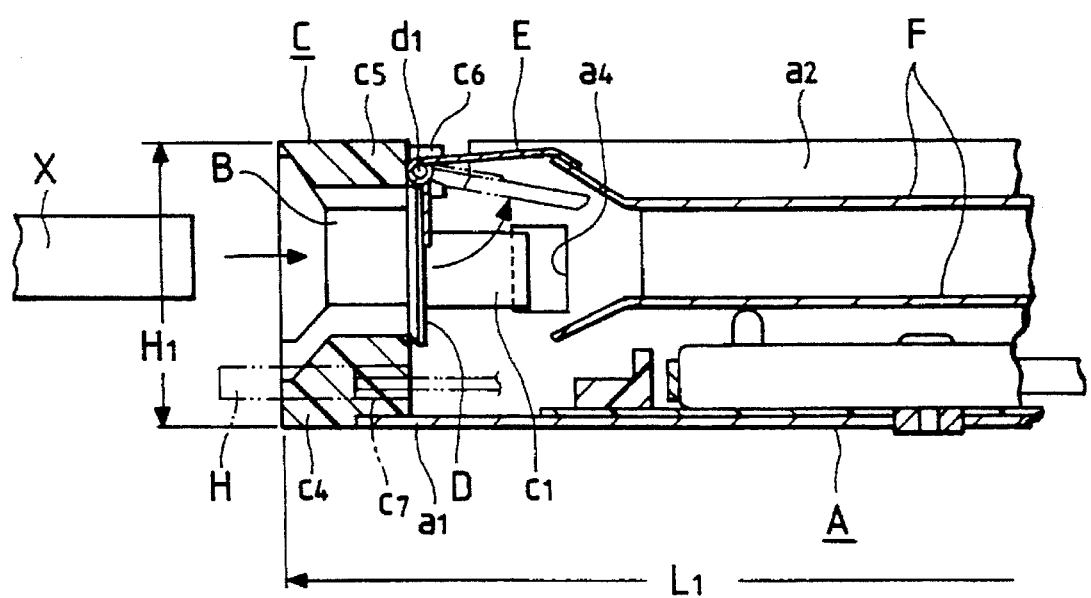
FIG. 6 is an enlarged sectional view showing a main portion of the 3.5" floppy disk drive system of FIG. 5.

On the other hand, as shown in FIG. 3 (a) and FIG. 4 (a), to prevent breakage and deformation by external force of the upper side portion 6d of the front frame 6 whose sectional area is small, a back projection 14 projecting rearward is integrally molded at the center of the back of the front frame 6. In addition, a front end extension 4b of the cam plate 4 corresponding to the back projection 14 extends toward the front frame 6, so that the distal end of the front end extension 4b is inserted immediately below the back projection 14.

Further, to prevent breakage and deformation by external force of the upper side portion 6d of the front frame 6 whose sectional area is small, a plurality of back projections 14 projecting toward an upper edge 8e of the main body 8c of the front door 8 are integrally molded at the back of the front frame 6 as shown in FIGS. 3 (b) and 4 (b). A plurality of upper edge notches 15 for receiving these back projections 14 are formed on the upper edge 8e of the front door 8 so as to correspond to the back projections 14. The upper edge notches 15 are provided to minimize the vertical dimension $H_2$ of the front frame 6 as well as to correctly position the back projections 14 with respect to the upper edge 8e of the main body 8c of the front door 8.

Since the drive system, which is the shown embodiment of the device, is of such construction as described above, the vertical dimension $H_2$ and the depth $L_2$ can be reduced to downsize the drive system as a whole for the following reasons.

The reduction in the vertical dimension will be described first.

The shown drive system has no shaft support portion for the front door 8 on the upper side portion 6d of the front frame 6. Thus, the front door 8 is attached to the door attaching holes 1e, 1f arranged on both lateral walls 1a, 1b of the main chassis 1. This means that the upper side portion 6d is not necessarily mechanically rigid, which in turn allows the vertical dimension $H_2$ to be reduced by reducing the vertical dimension of the upper side portion 6d. Of course, this structure allows the depth $L_2$ of the drive system to be reduced as much as a portion otherwise occupied by the shaft support portion of the front frame 6, thereby contributing to the reduction in the depth of the drive system. Moreover, this structure allows the horizontal dimension $W_2$ of the drive system as much as a portion otherwise occupied by the side portion of the front frame 6, thereby contributing to the reduction in a horizontal sectional area of the drive system.

Since the eject button 13 integrated with the eject lever 12 is located at the recess 11 formed on the upper side portion 6d of the front frame 6, a button hole conventionally formed on the lower side portion 6a of the front frame 6 can be dispensed with, so that the vertical dimension of the lower side portion 6a is reduced to thereby reduce the entire vertical dimension $H_2$ of the front frame 6. The relationship between the eject button 13 and the recess 11 is advantageous in adopting an assembling method involving the step of positioning the eject button 13 on the recess 11 of the front frame 6 from above the front frame 6 that has been attached to the main chassis 1 in advance. This is an assembling process far simpler than the conventional process that involves the steps of: positioning the eject button at the rear of the button hole of the front frame 6 attached to the main chassis 1 and thereafter inserting the eject button into the button hole by moving the eject button and the eject lever frontward.

Still further, to reduce the vertical dimension $H_2$, the relationship between the back projection 14 of the upper side portion 6d of the front frame 6 and the front end extension 4b of the cam plate 4 is contributing. That is, as shown in FIG. 4 (a) and (b), as the upper side portion 6d of the front frame 6 whose sectional area is small is about to be deformed downward by an external force, the back projection 14 of the upper side portion 6d is abutted against the front end extension 4b of the highly rigid cam plate 4. The rigidity of the cam plate 4 blocks the deformation of the upper side portion 6d. As a result, even if the upper side portion 6d whose sectional area is small has the vertical dimension thereof reduced, breakage and deformation of such upper side portion 6d by external force can be prevented. This contributes to downsizing the drive system by reducing the vertical dimension $H_2$ of the front frame 6.

Further, to reduce the vertical dimension $H_2$, the upper edge 8e of the front door 8 and the back projections 14 of the upper side portion 6d are quite contributing. That is, even if the front door 8 is thin, the front door 8 has such a large second moment of area in the vertical direction as not to cause itself to be deformed with ease by a vertically exerted external force. Therefore, as shown in FIG. 4, when the upper side portion 6d whose sectional area is small receives a downward external force and the upper side portion 6d is therefore about to be deformed by a bending moment derived from the downward external force, the back projections 14 of the upper side portion 6d are abutted against the upper edge 8e of the front door 8, thereby causing the front door 8 to block the deformation of the upper side portion 6d. As a result, even if the upper side portion 6d whose sectional area is small has the vertical dimension thereof reduced, breakage and deformation of such upper side portion 6d by external force can be prevented. This contributes to downsizing the drive system by reducing the vertical dimension $H_2$ of the front frame 6.

On the other hand, to reduce the depth $L_2$ of the drive system, the main body 8c of the front door 8 and the stopper projection 10 are contributing, the main body 8c having a small vertical dimension $h_2$ that is substantially equal to the dimension of the opening on the back side of the disk insertion opening 5. That is, even if the main body 8c of the front door 8 is substantially equal to the dimension of the opening on the back side of the disk insertion opening 5, the opening and closing positions therefor can be provided owing to the presence of the stopper projection 10. As a result, the depth $L_2$ of the drive system can be reduced only by providing the stopper projection 10 with a space of relief inside the drive system.

While the example in which the device is applied to a 3.5" floppy disk drive system has been described in the above embodiment, it goes without saying that the device may be applied to other types of magnetic recording systems.

As is apparent from the foregoing, according to the device, the back projection integrally molded on the upper side portion of the front frame is received from below by the front end extension of the highly rigid cam plate. Therefore, even if the upper side portion of the front frame has a small sectional area, a structure that is free from deformation or shearing fracture of the upper side portion can be obtained.

As is apparent from the foregoing, according to the device, the back projections integrally molded on the upper side portion of the front frame are abutted against the front door whose second moment of area in the vertical direction is relatively large when the upper side portion is about to be deformed by an external force. Therefore, even if the upper side portion of the front frame has a small sectional area, a magnetic drive system of such a simple structure as not to allow the upper side portion to be subjected to deformation and shearing fracture by external force can be obtained.

While the example in which the stopper projection 10 of the front door 8 is abutted against the cam plate 4 during the opening of the front door 8 has been described in the above embodiment, it may be so designed that an upper wall 2a of the front end portion of the disk holder 2 is extended toward the front frame 6 as shown by the phantom line in FIG. 2 so that the stopper projection 10 is abutted against the upper wall 2a during the opening of the front door 8.

As is apparent from the foregoing, according to the device, the closing and opening positions of the front door are provided by the main body and the stopper projection molded integrally on the lower portion of the main body, the main body being of a small dimension in the vertical direction which is substantially equal to the dimension of the opening on the back side of the disk insertion opening formed on the front frame. Therefore, the depth of a magnetic recording system can be reduced to allow the magnetic recording system to be downsized as a whole.

As is apparent from the foregoing, according to the device, a pair of small door attaching holes are formed on the upper front corners of both lateral walls of the main chassis, and the pivot pins molded integrally on the front door are inserted into the door attaching holes with the front door resiliently flexed. Therefore, a downsized magnetic recording system whose vertical and horizontal dimensions are reduced can be obtained.

While the example in which the recess 11 is formed on the upper side portion 6d of the front frame 6 has been described in the above embodiment, a similar advantage may also be obtained by arranging the recess on the lower side portion 6a of the front frame 6.

As is apparent from the foregoing, according to the device, the recess is formed on the upper side portion or the lower side portion to locate the eject button on the recess. Therefore, even if the vertical dimension of the front frame is reduced, a structure that is free from cracks and deformation of the upper and lower side portions due to secular change can be obtained. In addition, according to the device, an assembling method involving the step of setting the eject button on the recess of the front frame either from above or from below can be adopted, which contributes to simplifying the assembling process.

What is claimed is:

1. A front structure for a magnetic recording device comprising:

a main chassis having a front portion;

a front frame secured to said front portion of said main chassis;

the front frame comprising resin and having a disk insertion opening and a back side;

a front door for closing the disk insertion opening, the front door being pivotally supported by the main chassis and positioned on said back side of the front frame; and a stopper projection, coupled to said front door, for limiting pivotal motion of said front door, said front frame including an upper side portion and at least one back projection projecting rearwardly from the back of said upper edge portion of said front frame and said front door includes an upper edge, and said back projection is positioned on said upper edge of the front door, thereby avoiding deformation of the upper side portion of said front frame due to an external force, said front door includes an upper edge, a lower edge and at least one notch formed on said upper edge for receiving said at least one back projection, and wherein said front frame includes an upper side portion and lower portion having an upper surface, wherein when said front door is closed over said disk insertion opening, said lower edge of said front door contacts said upper surface of said lower portion of said front frame, thereby avoiding deformation of said upper side portion of said front frame due to an external force.

2. A front structure for a magnetic recording device as claimed in claim 1, wherein the front frame includes an upper side portion and a back projection projecting rearwardly and which is integrally molded on the back side of the upper side portion of the front frame.

3. A front structure for magnetic recording device as claimed in claim 2, further comprising:

a cam plate comprising an upper side portion of the main chassis;

said cam plate having a front end extension with a distal end;

wherein said distal end of said front end extension of the cam plate is positioned below the back projection, thereby avoiding deformation of the upper side portion of said front frame due to an external force.

4. A front structure for a magnetic recording device as claimed in claim 1, wherein said main chassis includes lateral walls having upper front corners, and said front structure includes a pair of front door attaching holes on said upper front corners of said lateral walls of the main chassis.

5. A front structure for a magnetic recording device as claimed in claim 4, wherein said front door includes first and second pivot pins for positioning said front door in said front door attaching holes.

6. A front structure for a magnetic recording device as claimed in claim 1, wherein said front frame includes an upper side portion and a lower side portion and wherein said upper side portion of said front frame includes an upper surface, said lower side portion of said front frame includes a lower surface, and wherein the front frame includes a recess for positioning an eject button on one of said upper side portion and said lower side portion of the front frame, the recess having an opening toward one of the upper surface of the upper side portion and said lower surface of the lower side portion.

7. A front structure for a magnetic recording device as claimed in claim 1, further comprising:

a disk holder coupled to said main chassis; and a cam plate comprising an upper side portion of said main chassis, said stopper projection for abutting one of said back side of the front frame, said disk holder and said cam plate to thereby limit said pivotal motion of said front door.

8. A front structure for a magnetic recording device as claimed in claim 7, wherein horizontal and vertical dimensions of the front door are set to a value substantially equal to horizontal and vertical dimensions of the disk insertion opening on said back side of said front frame.

9. A front structure for a magnetic recording device as claimed in claim 7, wherein said stopper projection is integrally formed with said front door.

10. A front structure for a magnetic recording device as claimed in claim 1, further including stepped portions on said back side of said front frame for structurally engaging said main chassis.

11. A front structure for a magnetic recording device as claimed in claim 1, wherein said front door comprises a flexible material for being resiliently bent.

12. A front structure for a magnetic recording device as claimed in claim 1, further comprising a return spring coupled to said main chassis, wherein said front door includes an integrally molded attaching pin for attachment to said return spring.

13. A front structure for a magnetic recording device as claimed in claim 1, wherein the front frame includes a plurality of back projections integrally molded on said back side of said front frame projecting rearwardly.

* * * * *